Feb. 25, 1969 A. ORTLIEB 3,429,991

FACSIMILE SYSTEM FOR REPRODUCING A PICTURE OR THE LIKE ON A METAL LAYER

Filed Jan. 14, 1965

INVENTOR
ALFRED ORTLIEB

BY Michael S. Striker

ATTORNEY 3,429,991

FACSIMILE SYSTEM FOR REPRODUCING A PICTURE OR THE LIKE ON A METAL LAYER

Alfred Ortlieb, Stuttgart-Vaihingen, Germany, assignor to Robert Bosch G.m.b.H., Stuttgart, Germany
Filed Jan. 14, 1965, Ser. No. 425,576
Claims priority, application Germany, Jan. 17, 1964, B 75,040
U.S. Cl. 178—6.6 12 Claims
Int. Cl. H04n *5/76;* G01d *15/10*

ABSTRACT OF THE DISCLOSURE

A facsimile arrangement for remotely reproducing a picture or similar information on a metallic layer. The picture ito be reproduced is mounted on a rotating drum and scanned by a photosensitive source. The source is movable in an axial direction with respect to the drum, for the purpose of scanning the entire area of the picture or recorded material on the surface of the drum. The photosensitive source converts the light signal from the scanned picture, into an electrical signal which, after suitable amplification, is transmitted to a receiving drum upon which is mounted the metallic layer. The latter may be vapor-deposited onto an insulating base or carrier which, in turn, is wrapped around the cylindrical surface of the receiving drum. An electrode is in contact with the surface of the metallic layer, and the electrical signal transmitted from the photosensitive source, is used to burn an impression into the metallic layer which corresponds to the picture scanned. The electrode is also movable axially along the receiving drum, in a manner similar to that prevailing for the drum holding the picture to be scanned. The receiving drum has cleaning apparatus for periodically wiping the electrode and thus providing a cleaning effect to it.

The present invention relates to a facsimile system for transmitting a picture or the like. More particularly, the invention relates to a facsimile system for reproducing a picture or the like on a metal layer.

Known types of facsimile systems for transmitting pictures or the like utilize normal types of paper at the receiver and reproduce the transmitted picture on the paper by means of an electromechanical writing arrangement utilizing a pigment applying tracing wheel. Other known types of facsimile systems utilize chemically treated or otherwise specially treated paper at the receiver and reproduce the transmitted picture on such papr by electrochemical or thermal means. The known types of facsimile systems have disadvantages and limitations among which are small resolution quality and relatively low transmission speeds.

The principal object of the present invention is to provide a new and improved facsimile transmission system.

An object of the present invention is to provide a facsimile system having good resolution quality.

An object of the present invention is to provide a facsimile system having high transmission speeds.

In accordance with the present invention, the facsimile transmission system comprises a transmitter scanning arrangement for scanning a picture and the like which produces an electrical signal having a characteristic which varies in accordance with dark and light contrasts of the picture. A receiver reproduction arrangement provides a reproduction of the picture and comprises a carrier and a metal layer on the carrier. A receiver scanning arrangement scans the metal layer of the receiver reproduction arrangement in synchronism with the transmitter scanning arrangement and comprises a burner electrode in proximity with the metal layer for burning a determined area of the metal layer when the burner electrode is energized by an electrical signal. The electrical signal produced by the transmitter scanning arrangement is supplied to the burner electrode of the receiver scanning arrangement to burn in the metal layer a plurality of areas corresponding to the picture.

The facsimile system of the present invention provides considerably greater resolution quality and high transmission speeds than known types of systems.

In order that the present invention may be readily carried into effect, it will now be described with reference to the accompanying drawing, wherein.

Figure 1:
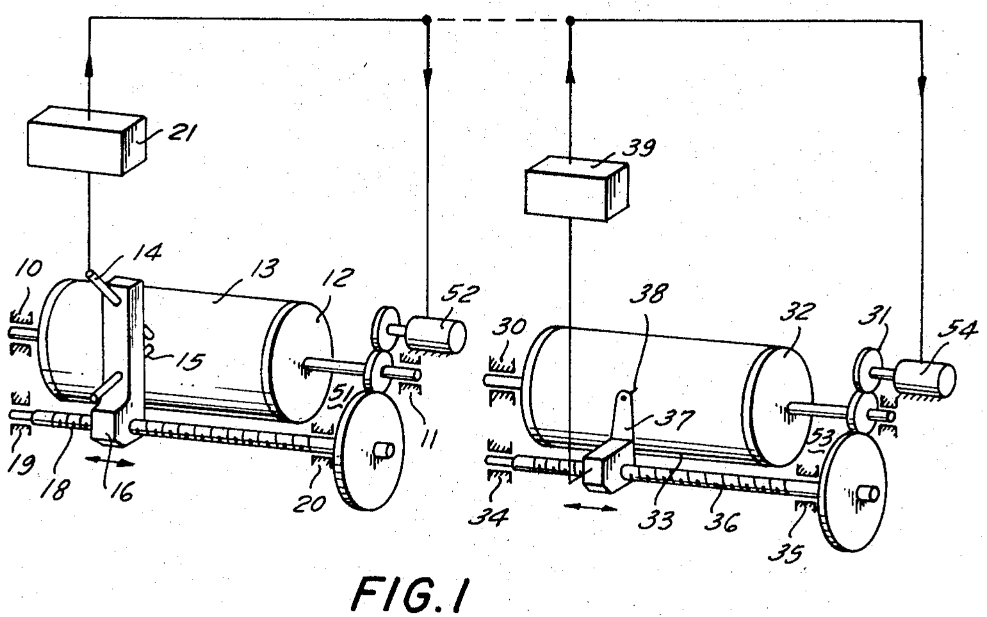
FIG. 1 is a perspective view of an embodiment of a facsimile system of the present invention.

In FIG. 1, a transmitter scanning arrangement scans a picture or the like to produce an electrical signal having a characteristic which varies in accordance with dark and light contrasts of the picture. The picture is scanned on a shaft 13 which is mounted on the curved surface of a cylinder 12. The cylinder 12 is rotatably mounted in axial end bearings 10 and 11.

A threaded member 18 of rod-like configuration is rotatably mounted in axial end bearings 19 and 20 in proximity with and substantially parallel to the cylinder 12. The cylinder 12 and the threaded rod 18 are coupled to each other by any suitable coupling arrangement such as, for example, a gear train or friction coupling 51 and are driven via said coupling arrangement by a motor 52.

The picture or the like on the sheet 13 is scanned by a suitable photocell 14 and source of light 15 supported by a holder 16 which is mounted in threaded engagement with the threaded rod 18 so that rotation of said rod moves said holder in an axial direction along said rod. The picture is scanned in the usual manner by the photocell and light source combination as the cylinder 12 and the rod 18 are rotated, and the photocell produces, in the usual manner, an electrical signal which has a characteristic which varies in accordance with the dark and light contrasts of the picture. Thus, for example, the electrical signal may comprise a current which has a magnitude which is a maximum at black and a minimum at white or vice versa and which varies at the different shades of grey between black and white. In a preferred embodiment of the present invention, the current produced by the photocell 14 has a maximum magnitude at white in the picture and a minimum magnitude at black in the picture.

In an operative embodiment of the invention, the diameter of the cylinder 12 may be 100 mm., the threaded rod may have a pitch of 1 mm., the coupling ratio of the cylinder to the threaded rod may be 1:5, the cylinder may be rotated at 1000 r.p.m., the holder 16 and therefore the photocell may move in an axial direction at the rate of 0.5 mm. per turn or revolution of the cylinder. In this case, the photocell 14 moves at the rate of 20 cm. per minute, so that a picture or the like having a width of about 20 cm. may be scanned by the photocell in one minute and may be transmitted in the same one minute.

The signal produced by the photocell 14 may be amplified by any suitable means such as, for example, an amplifier 21, and transmitted by any suitable wire or wireless means to a receiver. The transmission channel may have a frequency, for example, of 100 kilocycles per second. The signal received at the receiver may be amplified by any suitable means such as, for example, an amplifier 39.

At the receiver, a receiver reproduction arrangement provides a reproduction of the picture. The receiver repoduction arrangement comprises a carrier such as, for example, a paper sheet, having a metal layer 33 on its surface. A receiver scanning arrangement scans the metal layer 33 of the receiver reproduction arrangement in synchronism with the transmitter scanning arrangement. The carrier and its metal layer 33 are mounted on the curved surface of a cylinder 32. The cylinder 32 is rotatably mounted in axial end bearings 30 and 31.

A threaded member 36 of rod-like configuration is rotatably mounted in axial end bearings 34 and 35 in proximity with and substantially parallel to the cylnider 32. The cylinder 32 and the threaded rod 36 are coupled to each other by any suitable coupling arrangement such as, for example, a gear train or friction coupling 53 and are driven via said coupling arrangement by a motor 54. The motors 52 and 54 are driven in synchronism by any suitable means such as, for example, a starting signal provided by the photocell 14 at the initiation of scanning of the picture. The synchronous operation of the motors 52 and 54 provides synchronous operation of the transmitter and receiver scanning arrangements.

The carrier-mounted metal layer 33 is scanned by a burner electrode 38 supported by an electrode holder 37 in proximity with the metal layer. The electrode holder 37 is mounted in threaded engagement with the threaded rod 36 so that rotation of said rod moves said electrode holder in an axial direction along said rod. The metal layer 33 is burnable and the burner electrode 38 is sufficiently close to the metal layer or in contact therewith so that when said burner electrode is energized by the electrical signal received by the receiver from the transmitter, it burns a determined area of the metal layer.

The signal produced by the photocell 14, which varies, for example in magnitude, in accordance with the dark and light contrasts of the picture scanned at the transmitter, is thus transmitted to the burner electrode 38 which burns dots or holes in the metal layer 33 at the receiver in accordance with said dark and light contrasts to thereby reproduce the picture on the metal layer. Thus, for example, if a white area of the picture is scanned at the transmitter, the signal transmitted to the burner electrode 38 at the receiver has a maximum magnitude and said burner electrode burns a corresponding hole in the metal layer 33. If a black area of the picture is scanned at the transmitter, the signal transmitted to the burner electrode 38 at the receiver has a minimum magnitude and said burner electrode is not energized and does not burn a hole in the metal layer at that point.

In an operative embodiment of the invention, the diameter of the cylinder 32 is the same as that of the cylinder 12, the pitch of the threaded rod 36 is the same as that of the rod 18 and the coupling ratio of the cylinder 32 to the threaded rod 36 is the same as that of the cylinder 12 to the threaded rod 18.

In order to attain good resolution, the thickness of the metal layer 33 should be very little relative to the width of the hole or line burned by the burner electrode 38. The metal layer 33 is therefore made with a thickness of less than 0.002 mm. and preferably has a thickness of 0.0001 mm. The dots, holes or lines burned into the metal layer 33 have a width which may vary from 0.01 to 1.0 mm. The metal layer 33 is preferably applied to the carrier sheet by vapor deposition, so that it is considerably thinner than layers utilized in chemical and thermal arrangements. The known chemical and thermal arrangements thus produce relatively broad or wide holes or lines in reproduction so that they provide relatively poor resolution.

The reproduction of the transmitted picture produced by the burner electrde 38 n the metal layer 33 comprises a plurality of burned out dots or holes each of which may have, for example, a diameter of 0.2 mm. Each dot or hole is burned out in from one to two microseconds. The entire reproduction of the picture may thus be completed in less than 200 milliseconds and in the illustrated operative embodiment of the invention, the reproduction of the picture is completed in approximately 5 milliseconds. This speed of transmission is about 7 times faster than the speed of transmission of known electromechanical systems.

The facsimile transmission system of the present invention may utilize, if desired, a yes-no or on-off circuit at the receiver. A constant scanning signal or current would be switched on and off by the on-off circuit so that a picture line of corresponding width would be burned out in interrupted fashion to provide an interrupted line. This may be desirable when the quality of the picture is poor and/or the level of interference along the transmission route so requires. The scanning current at the receiver or the resistance of a resistor in the scanning circuit at the receiver may be varied in magnitude in accordance with the picture signals transmitted and received by the receiver. This produces a picture line of corresponding width which is burned out in uninterrupted fashion to provide an uninterrupted line which appears at reading distance as picture gradation.

Figure 2:
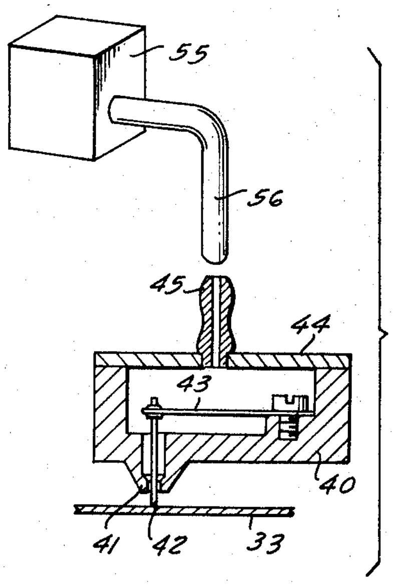
FIG. 2 is a side view, partly in section, of an embodiment of a burner electrode arrangement which may be utilized in the facsimile system of FIG. 1.

In order to maintain the clarity of the reproduction, the burner electrode should be kept free of contamination by the metal burned off or vaporized from the metal layer 33 during operation. A suitable metal for use as the metal layer 33 is a zinc-cadmium alloy and/or its oxides. FIG. 2 illustrates an electrode holder which may be utilized in the embodiment of FIG. 1 and which keeps the burner electrode free of contamination by vaporized metal from the metal layer 33. The electrode holder of FIG. 2 is a pressure type self-cleaning arrangement.

In FIG. 2, an air-tight or gas-tight housing 40 is provided with an outlet opening or aperture 41 through which a burning electrode 42 passes from inside said housing to extend to contact or near-contact with the metal layer 33. The burner electrode 42 may comprise, for example, a wire having a thickness or diameter of 0.2 mm. A leaf spring 43 is affixed at one end to the inside of the housing 40 and supports at its other end the burner electrode 42. The leaf spring 43 urges the burner electrode 42 into contact with the metal layer 33.

The housing 40 is provided with a removable cover 44 provided with an air or gas conduit 45 to which a hose, conduit, tube or pipe may be connected to supply air or gas under pressure into the housing. The air may be supplied by any suitable arrangement such as, for example, a source 55 of air under pressure and a connecting tube 56 extending from said source of air to the air conduit 45. The air under pressure supplied to the housing 40 from the source 55 of air pressure continually blows away any metal residue vaporized onto the burner electrode 42. This insures that the width of the picture line produced by the burning electrode 42 remains constant. Furthermore, the stream of air suplied to the housing 40 and flowing through the outlet opening 41 serves to cool the burning electrode 42.

Figure 3:
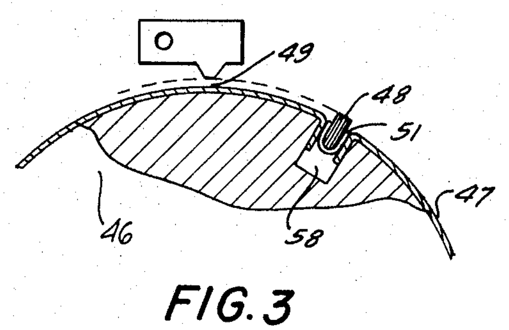
FIG. 3 is a side view, partly in section, of an embodiment of a burner electrode cleaning arrangement which may be utilized in the facsimile system of FIG. 1.

FIG. 3 illustrates another arrangement for keeping the burner electrode free of contamination by vaporized metal from the metal layer 33. In FIG. 3, a metal layer 47 is mounted on a cylinder 46 by a wedge 57 which holds the ends of the metal layer and its carrier tightly in a groove formed in the cylinder. A brush 48 is mounted in the open wedge 57 and extends from the curved surface of the cylinder 46 a distance sufficient to enable said brush to abut against the burner electrode 49 each time said burner electrode passes said brush. The burner electrode 49 is thus brushed clean once during each revolution of the cylinder 46. Any suitable arrangement may be utilized wherein members supported by the cylinder 46 periodically abut the burner electrode 49 and remove any metal residue thereon without damage to said burner electrode.

The facsimile system of the present invention may be utilized to produce reproductions of the transmitted picture which are on a smaller scale than the transmitted picture or reproductions which are on a larger scale than the transmitted picture. In order to produce a reproduction on a smaller scale than the transmitted picture, the diameter of the receiver cylinder 32 must be smaller than that of the transmitter cylinder 12 and the speed of axial movement of the burner electrode 38 must be slower than that of the photocell scanner 14, although the transmitter and receiver cylinders are driven in synchronism.

In order to produce a reproduction on a larger scale than the transmitted picture, the diameter of the receiver cylinder 32 must be larger than of the transmitter cylinder 12 and the speed of axial movement of the burner electrode 38 must be faster than that of the photocell scanner 14, although as in each each of same scale or smaller scale reproduction, the transmitter and receiver cylinders are driven in synchronism.

While the invention has been described by means of a specific example and in specific embodiments, I do not wish to be limited thereto, for obvious modification will occur to those skilled in the art without departing from the spirit and scope of the invention.

What I claim is:

1. A facsimile system for transmitting a picture and the like comprising, in combination, transmitter scanning means for scanning a picture and for producing an electrical signal having a characteristic which varies in accordance with dark and light contrasts of the picture;

receiver reproduction means for providing a reproduction of said picture, said receiver reproduction means comprising an insulating carrier and a metal layer on said carrier;

receiver scanning means for scanning the metal layer of the receiver reproduction means in synchronism with said transmitter scanning means, said receiver scanning means comprising a burner electrode in contact with said metal layer for burning said metal layer to equal depth but over a varying area of said metal layer when said burner electrode is energized by an electrical signal varying in accordance with the dark and light contrasts of the picture, said varying area corresponding to said varying electrical signal; and transmission means for supplying to the burner electrode of said receiver scanning means the electrical signal produced by said transmitter scanning means to burn in the metal layer of said receiver reproduction means a plurality of areas corresponding in pattern to said picture, whereby said picture burned in said metal layer corresponds in detail to the picture scanned by said transmitter scanning means scanning said picture at substantially high speed to provide high-speed facsimile transmission of a picture.

2. The facsimile system for transmitting a picture as defined in claim 1 wherein the speed of said scanning means is within the range of 5 to 100 meters/sec., the width of said area is within the range of 1.0 to 0.1 millimeter, and the thickness of said metal layer is less than 0.0001 millimeter.

3. A facsimile system for transmitting a picture and the like comprising, in combination, transmitter scanning means for scanning a picture and for producing an electrical signal having a characteristic which varies in accordance with dark and light contrasts of the picture;

receiver reproduction means for providing a reproduction of said picture, said receiver reproduction means comprising an insulating carrier and a metal layer on said carrier;

receiver scanning means for scanning the metal layer of the receiver reproduction means in synchronism with said transmitter scanning means, said receiver scanning means comprising a burner electrode in contact with said metal layer for burning said metal layer to equal depth but over a varying area of said metal layer when said burner electrode is energized by an electrical signal varying in accordance with the dark and light contrasts of the picture, said varying area corresponding to said varying electrical signal;

transmission means for supplying to the burner electrode of said receiver scanning means the electrical signal produced by said transmitter scanning means to burn in the metal layer of said receiver reproduction means a plurality of areas corresponding in pattern to said picture; and circuit means connected between said burner electrode and said transmission means for varying the electrical energy supplied to said burner electrode to produce gradations in the reproduction of said picture, whereby said picture burned in said metal layer corresponds in detail to the picture scanned by said transmitter scanning means scanning said picture at substantially high speed to provide high speed facsimile transmission of a picture.

4. A facsimile system for transmitting a picture and the like comprising, in combination, transmitter scanning means for scanning a picture and for producing an electrical signal having a characteristic which varies in accordance with dark and light contrasts of the picture, said transmitter scanning means comprising a source of light and a photocell in cooperative relation with said source of light, both said source of light and said photocell being in operative proximity with said picture;

receiver reproduction means for providing a reproduction of said picture, said receiver reproduction means comprising an insulating carrier and a metal layer on said carrier;

receiver scanning means for scanning the metal layer of the receiver reproduction means in synchronism with said transmitter scanning means, said receiver scanning means comprising a burner electrode in contact with said metal layer for burning said metal layer to equal depth but over a varying area of said metal layer when said burner electrode is energized by an electrical signal varying in accordance with the dark and light contrasts of the picture, said varying area corresponding to said varying electrical signal; and transmission means for supplying to the burner electrode of said receiver scanning means the electrical signal produced by said transmitter scanning means to burn in the metal layer of said receiver reproduction means a plurality of areas corresponding in pattern to said picture, whereby said picture burned in said metal layer corresponds in detail to the picture scanned by said transmitter scanning means scanning said picture at substantially high speed to provide high-speed facsimile transmission of a picture.

5. A facsimile system for transmitting a picture and the like comprising, in combination, transmitter scanning means for scanning a picture and for producing an electrical signal having a characteristic which varies in accordance with dark and light contrasts of the picture, said transmitter scanning means comprising a first cylinder, said picture being mounted on the curved surface of said cylinder, a source of light and a photocell in cooperative relation with said source of light, both said source of light and said photocell being in operative proximity with said picture, and first driving means for rotating said first cylinder and for moving said source of light and said photocell in axial direction along the curved surface of said first cylinder;

receiver reproduction means for providing a reproduction of said picture, said receiver reproduction means comprising an insulating carrier and a metal layer on said carrier;

receiver scanning means for scanning the metal layer of the receiver reproduction means in synchronism with said transmitter scanning means, said receiver scanning means comprising a second cylinder, said carrier and said metal layer being mounted on the curved surface of said second cylinder, a burner electrode in contact with said metal layer for burning said metal layer to equal depth but over a varying area of said metal layer when said burner electrode is energized by an electrical signal varying in accordance with the dark and light contrasts of the picture, said varying area corresponding to said varying electrical signal, and second driving means for rotating said second cylinder in synchronism with said first cylinder and for moving said burning electrode in axial direction along the curved surface of said second cylinder in synchronism with the movement of said source of light and said photocell; and transmission means for supplying to the burner electrode of said receiver scanning means the electrical signal produced by said transmitter scanning means to burn in the metal layer of said receiver reproduction means a plurality of areas corresponding in pattern to said picture, whereby said picture burned in said metal layer corresponds in detail to the picture scanned by said transmitter scanning means scanning said picture at substantially high speed to provide high-speed facsimile transmission of a picture.

6. A facsimile system as claimed in claim 5, wherein said first and second cylinders each have a diameter equal to that of the other and wherein the speed of movement of said burner electrode and said source of light and photocell are the same so that the reproduction of said picture is on the same scale as said picture.

7. A facsimile system as claimed in claim 5, wherein said second cylinder has a diameter larger than the diamer of said first cylinder and wherein the speed of movement of said burner electrode is faster than that of said source of light and photocell so that the reproduction of said picture is on a larger scale than said picture.

8. A facsimile system as claimed in claim 5, wherein said second cylinder has a diameter smaller than the diameter of said first cylinder and wherein the speed of movement of said burner electrode is slower than that of said source of light and photocell so that the reproduction of said picture is on a smaller scale than said picture.

9. The facsimile system as defined in claim 5, including burner electrode cleaning means comprising brush means secured in a slot on said second cylinder and projecting from the surface of said second cylinder for cleaning said burner electrode by periodically abutting said burner electrode.

10. The facsimile system as defined in claim 9, wherein said brush means includes brush holding means for wedging said brush means into said slot and securing thereby said carrier to the surface of said second cylinder.

11. A facsimile system for transmitting a picture and the like comprising, in combination, transmitter scanning means for scanning a picture and for producing an electrical signal having a characteristic which varies in accordance with dark and light contrasts of the picture;

receiver reproduction means for providing a reproduction of said picture, said received reproduction means comprising an insulating carrier and a metal layer on said carrier;

receiver scanning means for scanning the metal layer of the receiver reproduction means in synchronism with said transmitter scanning means, said receiver scanning means comprising a burner electrode and movable electrode holder means for holding said burner electrode in contact with said metal layer for burning, said metal layer to equal depth but over a varying area of said metal layer when said burner electrode is energized by an electrical signal varying in accordance with the dark and light contrasts of the picture, said electrode holder means including means for removing vaporized metal residue from said burner electrode; and transmission means for supplying to the burner electrode of said receiver scanning means the electrical signal produced by said transmitter scanning means to burn in the metal layer of said receiver reproduction means a plurality of areas corresponding in pattern to said picture, whereby said picture burned in said layer corresponds in detail to the picture scanned by said transmitter scanning means.

12. A facsimile system for transmitting a picture and the like comprising, in combination, transmitter scanning means for scanning a picture and for producing an electrical signal having a characteristic which varies in accordance with dark and light contrasts of the picture;

receiver reproduction means for providing a reproduction of said picture, said receiver reproduction means comprising an insulating carrier and a metal layer on said carrier;

receiver scanning means for scanning the metal layer of the receiver reproduction means in sychronism with said transmitter scanning means, said receiver scanning means comprising a burner electrode and movable electrode holder means for holding said burner electrode in contact with said metal layer for burning a determined area of said metal layer when said burner electrode is energized by an electrical signal varying in accordance with the dark and light contrasts of the picture, said electrode holder means comprising a gas-tight housing and means for supplying gas under pressure through said housing to said burner electrode for removing vaporized metal residue from said burner electrode; and transmission means for supplying to the burner electrode of said receiver scanning means the electrical signal produced by said transmitter scanning means to burn in the metal layer of said receiver reproduction means a plurality of areas corresponding in pattern to said picture, whereby said picture burned in said metal layer corresponds in detail to the picture scanned by said transmitter scanning means.

References Cited

UNITED STATES PATENTS

| | | | |
|---|---|---|---|
| 2,079,310 | 5/1937 | Bennett | 178—6.6 |
| 2,520,761 | 8/1950 | Giel | 178—6.6 |
| 2,737,882 | 3/1956 | Early | 346—74 |
| 2,741,530 | 4/1956 | Hill | 346—139 |
| 3,074,066 | 1/1963 | Conerly | 346—74 |
| 3,204,075 | 8/1965 | Browning | 219—70 |
| 3,210,514 | 10/1965 | Stepath | 219—70 |
| 2,051,511 | 8/1936 | Finch | 346—138 |
| 2,489,691 | 11/1949 | Washington | 178—6.6 |

ROBERT L. GRIFFIN, *Primary Examiner.*

JOSEPH A. ORSINO, Jr., *Assistant Examiner.*

U.S. Cl. X.R.

346—74, 139